(12) United States Patent
Kennedy, III et al.

(10) Patent No.: US 9,061,182 B2
(45) Date of Patent: Jun. 23, 2015

(54) GOLF BALLS INCLUDING HIGHLY NEUTRALIZED POLYMER HAVING A HARDNESS MODIFIER

(75) Inventors: Thomas J. Kennedy, III, Wilbraham, MA (US); Seisuke Tomita, Tokyo (JP)

(73) Assignee: NIKE, Inc., Beaverton, OR (US)

( * ) Notice: Subject to any disclaimer, the term of this patent is extended or adjusted under 35 U.S.C. 154(b) by 450 days.

(21) Appl. No.: 13/435,211

(22) Filed: Mar. 30, 2012

(65) Prior Publication Data

US 2013/0260919 A1     Oct. 3, 2013

(51) Int. Cl.
*A63B 37/06*     (2006.01)
*A63B 37/00*     (2006.01)
*A63B 45/00*     (2006.01)

(52) U.S. Cl.
CPC ......... *A63B 37/0064* (2013.01); *A63B 37/0003* (2013.01); *A63B 37/0074* (2013.01); *A63B 37/0076* (2013.01); *A63B 45/00* (2013.01); *A63B 37/0045* (2013.01); *A63B 37/0024* (2013.01); *A63B 37/0051* (2013.01); *A63B 37/0059* (2013.01)

(58) Field of Classification Search
CPC ........................ A63B 37/0024; A63B 37/0051
USPC .................... 473/378, 373, 374, 377
See application file for complete search history.

(56) References Cited

U.S. PATENT DOCUMENTS

| | | | |
|---|---|---|---|
| 6,100,321 A | 8/2000 | Chen | |
| 6,756,436 B2 | 6/2004 | Rajagopalan et al. | |
| 6,815,480 B2 | 11/2004 | Statz et al. | |
| 6,939,910 B2 | 9/2005 | Nakagawa et al. | |
| 6,977,276 B2 | 12/2005 | Henning | |
| 7,156,755 B2 | 1/2007 | Kennedy et al. | |
| 7,306,529 B2 | 12/2007 | Kennedy et al. | |
| 7,365,128 B2 | 4/2008 | Sullivan | |
| 7,402,114 B2 | 7/2008 | Binette et al. | |
| 7,637,824 B2 | 12/2009 | Shindo et al. | |
| 7,652,086 B2 | 1/2010 | Sullivan et al. | |
| 8,058,331 B2 | 11/2011 | Rajagopalan et al. | |
| 2001/0018373 A1 | 8/2001 | Moriyama et al. | |
| 2003/0158312 A1 | 8/2003 | Chen | |
| 2005/0261424 A1 | 11/2005 | Snell et al. | |
| 2006/0264269 A1* | 11/2006 | Rajagopalan et al. | 473/371 |
| 2008/0026873 A1 | 1/2008 | Manami et al. | |
| 2009/0123689 A1 | 5/2009 | Visioli | |
| 2010/0227706 A1 | 9/2010 | Sullivan et al. | |
| 2011/0021291 A1 | 1/2011 | Kim et al. | |
| 2011/0105245 A1 | 5/2011 | Rajagopalan et al. | |

OTHER PUBLICATIONS

Notification of Transmittal of the International Search Report and The Written Opinion of the International Searching Authority in connection with International Patent Application No. PCT/US2013/034224 mailed on Aug. 23, 2013; 3 pages.

* cited by examiner

*Primary Examiner* — Raeann Gorden
(74) *Attorney, Agent, or Firm* — Honigman Miller Schwartz and Cohn LLP; Anna M. Budde; Jonathan P. O'Brien (57) ABSTRACT

A golf ball includes a core made from a highly neutralized polymer that has been mixed with a hardness modifier. The modifier may be a process oil or a plasticizer. In particular, the modifier may be a naphthenic process oil, a paraffinic process oil, a phthalate plasticizer, a trimellitate plasticizer, an adipate plasticizer, a sebacate-based plasticizer, a maleate-based plasticizer, and blends thereof. Also disclosed is a method for manufacturing a golf ball that includes changing the hardness of a highly neutralized polymer core.

19 Claims, 1 Drawing Sheet

FIG. 4

GOLF BALLS INCLUDING HIGHLY NEUTRALIZED POLYMER HAVING A HARDNESS MODIFIER

BACKGROUND

The present invention relates generally to golf balls. Specifically, this disclosure relates to golf balls including a highly neutralized polymer and a modifier, where the modifier changes the hardness of the highly neutralized polymer.

Golf is an increasingly popular sport at both the professional and amateur levels. Generally, mass produced golf balls should be able to meet the requirements of golfers of a wide variety of ability levels. For example, the materials used in the golf ball's construction may be chosen so as to make the golf ball more suitable for particular types of golfers.

Generally, modern golf balls are known to be made from a variety of polymer materials. The material making up a golf ball may affect the golf ball's performance characteristics in several ways. For example, the selection of the material used in a golf ball may affect the golf ball's coefficient of restitution, initial velocity off the tee, feel, durability over time, and other properties.

Suitable known materials for use in a golf ball include thermoset materials, such as rubber, styrene-butadiene copolymer, polybutadiene, cis-polyisoprene, and trans-polyisoprene. Known materials also include thermoplastics, such as ionomer resins, polyamides or polyesters, and thermoplastic polyurethane elastomers. Suitable materials also include polyurea compositions, as well as other materials.

In particular, ionomers are often used to form the various structural components of known golf balls. For example, ionomers such as Surlyn™ available from E.I. DuPont de Nemours & Company are known to be used for cover layers of golf balls. Other types of ionomers, generally referred to as highly neutralized polymers, may also be used in golf balls.

Specifically, highly neutralized polymers are known to be used as the material for a golf ball core. For example, U.S. Pat. No. 6,756,436 to Rajagopalan et al., entitled "Golf Balls Comprising Highly-Neutralized Acid Polymers" and filed Apr. 9, 2002, discloses golf balls having highly neutralized polymer cores. The disclosure of this application is hereby incorporated by reference. Other conventional highly neutralized polymers are generally disclosed in U.S. Pat. No. 7,652,086 to Sullivan et al., entitled "Highly-neutralized Thermoplastic Copolymer Center for Improved Multi-layer Core Golf Ball" and filed Feb. 3, 2006, the disclosure of which is hereby incorporated by reference.

Certain formulations of the highly neutralized polymer may affect various physical properties of the polymer material, and so may affect the play characteristics of a golf ball made from that material. For example, various highly neutralized polymers may achieve increased hardness, modulus, and resilience characteristics. These properties of highly neutralized polymers may be advantageous to golf ball covers, cores, or other structural components, in order to achieve desired play characteristics.

However, in many instances known to a person having ordinary skill in the art of golf ball manufacturing, a highly neutralized polymer may have a hardness that is higher than may be preferable. Specifically, a core made from a highly neutralized polymer may be harder than preferable to highly skilled golfers. Generally, a golf ball's "feel" may be related to the hardness of the material making up the golf ball's core. Highly skilled golfers may prefer golf balls that have a soft feel when hit by a golf club. A golf ball with a core made from a highly neutralized polymer may therefore fail to achieve a highly skilled golfer's preferred "soft feel."

Additionally, an overly hard core may cause the golf ball to make a higher (or "harder") than desirable sound when stuck by a golf club. Experienced golfers generally prefer their golf balls to make a low frequency sound when struck. However, a core with a high hardness may cause the sound to be of a higher frequency, which is sometime referred to by golfers as sounding "too clicky".

Furthermore, economic considerations may also make conventional highly neutralized polymers less than ideal. Namely, the price of raw highly neutralized polymer may be significantly higher than the price of other raw materials used in golf ball constructions.

U.S. Patent Application No. 2003/0158312 to Chen, entitled "Stearic-modified Ionomers for Golf Balls" and filed on Aug. 21, 2003, attempted to address some of the above discussed issues. This patent application discloses certain types of highly neutralized polymers, where the highly neutralized polymer is blended with ethylenically unsaturated carboxylic acid present in an amount of from 5 to 25 wt percent. For example, the highly neutralized polymer is modified with relatively low amounts of a stearic acid moiety in order to achieve improved resilience for a given level of hardness or PGA Compression values. The disclosure of this patent application is hereby incorporated by reference.

U.S. Pat. No. 7,637,824 to Shindo et al., entitled "Golf Ball" and issued on Dec. 29, 2009, also addresses modification of highly neutralized polymers. This patent discloses a golf ball with a cover layer made up of a type of highly neutralized polymer having a Shore D hardness of at least 60, an unsaturated fatty acid, and a metal neutralizing agent. The unsaturated fatty acid causes the highly neutralized polymer to soften.

However, there still exists a need in the art for a golf ball that addresses the above discussed shortcomings relating to hardness, sound, and economic considerations in the context of highly neutralized polymers.

SUMMARY

In one aspect, this disclosure provides a golf ball comprising a core and a cover layer. The cover layer substantially surrounds the core. At least one of the core and the cover layer is made of a polymer mixture. The polymer mixture comprises a polymer and a modifier. The polymer comprises a highly neutralized polymer. The modifier is selected from the group consisting of process oils, plasticizers, and blends thereof. The modifier is present in the polymer mixture in a sufficient amount such that the modifier reduces a hardness of the polymer mixture from a first value, that is approximately the same as a hardness of the highly neutralized polymer, to a second value that is less than the hardness of the highly neutralized polymer.

In another aspect, this disclosure provides a golf ball comprising an inner core, an outer core layer substantially surrounding the inner core, and at least one cover layer substantially surrounding the interior layer(s). At least one of the inner core and the outer core layer is comprised of a polymer mixture. The polymer mixture comprises a polymer and a modifier. The polymer comprises at least one highly neutralized polymer. The modifier is selected from the group consisting of naphthenic process oils, paraffinic process oils, phthalate esters, trimellitates, adipates, sebacate-based plasticizer, maleate-based plasticizer, and blends thereof. The modifier is present in the polymer mixture in an amount of from about 1 to about 25 parts by weight per 100 parts by weight of polymer. The modifier is also present in the polymer mixture in a sufficient amount such that the modifier reduces a hardness of the polymer mixture from a first value that is approximately the same as a hardness of the highly neutralized polymer to a second value that is less than the hardness of the highly neutralized polymer. The second value is at least about 2 Shore D less than the first value.

This disclosure also provides a method of manufacturing a golf ball comprising, first, receiving a highly neutralized polymer. Next, the method includes changing the hardness of the highly neutralized polymer by mixing a modifier therewith to form a polymer mixture. The modifier is selected from the group consisting of process oils, plasticizers, and blends thereof. The method also includes forming the polymer mixture into a core, and forming a cover layer around the core such that the cover layer substantially surrounds the core. The modifier is present in the polymer mixture in a sufficient amount such that the modifier reduces a hardness of the polymer mixture from a first value that is approximately the same as a hardness of the highly neutralized polymer to a second value that is less than the hardness of the highly neutralized polymer. The presence of the modifier also reduces a hardness value of the polymer mixture by a first proportion, and reduces the COR value of the core by a second proportion. The first proportion is greater than the second proportion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, this disclosure provides a golf ball including a highly neutralized polymer that has been modified to have a lower hardness through the addition of a modifier. The modifier may be a process oil, a plasticizer, or a blend thereof. The modifier reduces the hardness by a desired amount while only affecting the COR related properties to a slight degree. Accordingly, a golf ball may have the modified highly neutralized polymer in the core while also achieving a soft "feel" and a high COR.

As used herein, unless otherwise stated, the following terms are defined as follows.

The term "compression deformation" as used indicates the deformation amount of the ball, or any portion thereof, under a force; specifically, when the force is increased to become 130 kg from 10 kg, the deformation amount of the ball or portion thereof under the force of 130 kg reduced by the deformation amount of the ball or portion thereof under the force of 10 kg is the compression deformation value of the ball or portion thereof.

The term "hardness" as used herein is measured generally in accordance with ASTM D-2240. The hardness of a golf ball is measured on the land area of a curved surface of a molded ball. The hardness of a golf ball sub-component is measured on the curved surface of the molded sub-component. The hardness of a material is measured in accordance with ASTM D-2240 (on a plaque).

The term "coefficient of restitution" ("COR") as used herein is measured according to the method: a golf ball or golf ball sub-component is fired by an air cannon at an initial velocity of 40 m/sec, and a speed monitoring device is located over a distance of 0.6 to 0.9 meters from the cannon. The golf ball or golf ball sub-component strikes a steel plate positioned about 1.2 meters away from the air cannon, and then the golf ball or golf ball sub-component rebounds through the speed-monitoring device. The COR is the return velocity divided by the initial velocity. All COR values discussed herein are measured at an initial velocity of 40 m/sec unless otherwise indicated.

FIGS. 1-4 show certain embodiments of golf balls in accordance with this disclosure. Except as otherwise discussed herein below, any golf ball discussed herein may generally be any type of golf ball known in the art. Namely, unless the present disclosure indicates to the contrary, a golf ball may generally be of any construction conventionally used for golf balls, and may be made of any of the various materials known to be used in golf ball manufacturing. Furthermore, it is understood that any feature disclosed herein (including but not limited to various embodiments shown in the FIGS. and various chemical formulas or mixtures) may be combined with any other features disclosed here in any combination or sub-combination, as may be desired.

Figure 1:
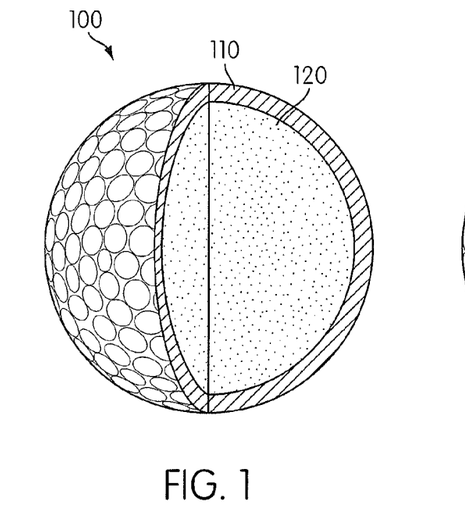
FIG. 1 shows a representative golf ball in accordance with this disclosure, the golf ball being of a two-piece construction.

FIG. 1 illustrates two layer or "two-piece" golf ball 100 having core 120 substantially surrounded by cover layer 110. In this golf ball embodiment, either or both of cover layer 110 and core 120 may comprise a modified highly neutralized polymer. In one particular embodiment, core 120 may comprise the modified highly neutralized polymer, while cover layer 110 may comprise any other suitable material such as polyurethane or an ionomer such as Surlyn®. In another particular embodiment, cover layer 110 may comprise the modified highly neutralized polymer, while core 120 may be comprised of any other suitable material such as polybutadiene rubber.

Figure 2:
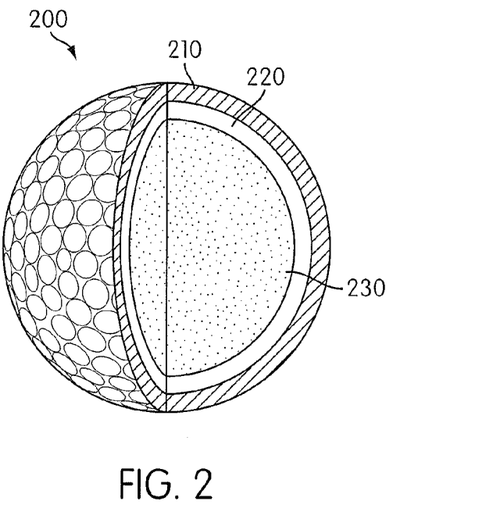
FIG. 2 shows a second representative golf ball, having a core, an inner cover layer, and an outer cover layer.

FIG. 2 illustrates three-piece golf ball 200 having a relatively large core 230 substantially surrounded by inner cover layer 220, which itself is encompassed within or substantially surrounded by outer cover layer 210. In this golf ball embodiment, any one or more of the structural components may be comprised of a modified highly neutralized polymer. For example, core 230 may comprise the modified highly neutralized polymer, while inner cover layer 220 and outer cover layer 210 may be comprised of conventionally known materials. In another embodiment, inner cover layer 220 may comprise the modified highly neutralized polymer, while core 230 and outer cover layer 210 may be comprised of known materials. In yet another embodiment, outer cover layer 210 may comprise the modified highly neutralized polymer, while core 230 and inner cover layer 220 may be comprised of known materials.

Figure 3:
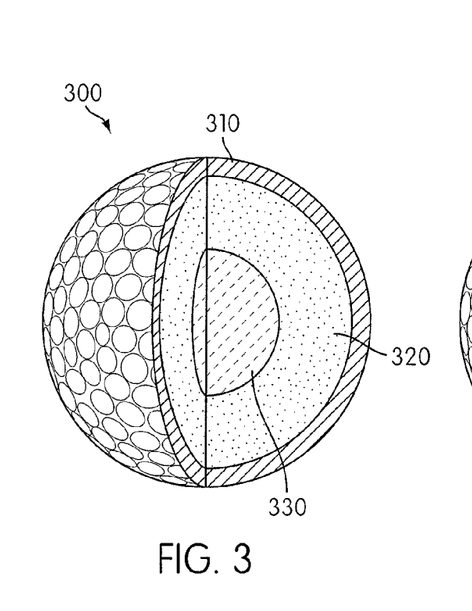
FIG. 3 shows a third representative golf ball, having an inner core, an outer core layer, and a cover layer.

FIG. 3 illustrates three-piece golf ball 300 having a relatively smaller inner core 330, outer core layer 320, and cover layer 310. Again, any one or more of the structural components of the golf ball may be comprised of a modified highly neutralized polymer. For example, core 330 may comprise the modified highly neutralized polymer, while outer core 320 and cover layer 310 may each be comprised of conventional materials. Alternatively, outer core 320 may comprise the modified highly neutralized polymer, while core 330 and cover layer 310 may be comprised of conventional materials. In yet another alternative embodiment, cover layer 310 may comprise the modified highly neutralized polymer, while core 330 and outer core 320 may be made from known materials.

Figure 4:
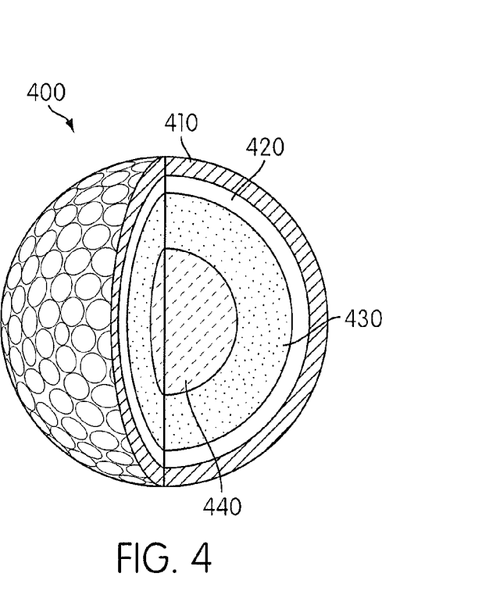
FIG. 4 shows a fourth representative golf ball, having an inner core, an outer core layer, an inner cover layer, and an outer cover layer.

FIG. 4 illustrates four-piece golf ball 400 having inner core 440, outer core layer 430, inner cover layer 420, and outer cover layer 410. In this embodiment, as in the above discussed embodiments, any one or more of the structural components of the golf ball may be comprised of a modified highly neutralized polymer. For example, inner core 440 may be comprised of the modified highly neutralized polymer, while outer core layer 430, inner cover layer 420, and outer cover layer 410 are all each made of conventional materials. In another embodiment, outer core layer 430 may be comprised of the highly neutralized polymer, while each of inner core 440, inner cover layer 420, and outer cover layer 410 are made of conventional material. In yet another embodiment, inner cover layer 420 may comprise the modified highly neutralized polymer, while each of inner core 440, outer core layer 430, and outer cover layer 410 are made of conventional materials. Alternatively, outer cover layer 410 may be comprised of the highly neutralized polymer, while each of inner core 440, outer core layer 430, and inner cover layer 420 may be made of known materials.

In embodiments such as shown in FIG. 4, the structural components making up the golf ball may have certain sizes. Inner core 440 may have a diameter of from about 20 mm to about 30 mm, or from about 21 mm to about 30 mm, or from about 22 mm to about 29 mm, or from about mm 23 to about 27 mm, or about 25 mm. Inner cover layer 420 may have a thickness of from about 0.5 mm to about 1.2 mm. Outer cover layer 410 may have a thickness of from about 0.6 mm to about 2 mm. Finally, outer core layer 430 may have a thickness that is not particularly limited. However, in some embodiments, golf ball 400 may be a regulation golf ball that meets USGA requirements. In such embodiments, the USGA requires that the total diameter of the golf ball be at least 1.680 inches. Therefore, the sum of: the diameter of inner core 440, the thickness of other layers (discussed below), and the thickness of outer core layer 430 may be at least 1.680 inches (42.67 mm). In some embodiments, the total diameter is equal to about 1.680 inches. In such embodiments, outer core 430 may have a thickness of from about 3 mm to about 10 mm, or from about 5 mm to about 8 mm, or about 7 mm.

Further, as described above, the disclosure relates to golf balls having at least 2 layers, or pieces. Thus, although discussion herein below may be directed to a 4-piece ball for convenience, the disclosure is directed to golf balls having at least 2-layers, and as many as 5, 6, or 7 layers, or more. The number of layers in the golf ball is limited only by any rules extant at the time of manufacture if the golf ball is to be considered a 'regulation' or 'conforming' golf ball.

Generally, for any arrangement of layers not specifically mentioned herein, any layer may be made of any material suitable for the purpose. For example, an outer cover layer should be tough and resistant to scuffing while being soft enough for a golf club to impart spin easily to the ball. Thus, thermoplastic polyurethane (TPU) and thermoset polyurethane are suitable for use in outer cover layers, as are known highly neutralized polymers and other ionomers. Thermoplastic polyurethane that is not otherwise scuff resistant can be treated to harden the surface, such as by a surface treatment. Suitable ionomers include members of the Surlyn® family of ionomeric polymers produced by E.I. DuPont de Nemours and Company and members of the Iotek® family of products produced by ExxonMobil Chemical Corporation.

Broadly, a highly neutralized polymer may be mixed with a modifier to form a polymer composition having physical properties that are different from the physical properties of the highly neutralized polymer by itself. The polymer in the polymer mixture may be a single type of highly neutralized polymer, a mixture of one or more types of highly neutralized polymers, or a mixture of a highly neutralized polymer and another type of polymer.

A highly neutralized polymer is a type of ionomer. An ionomer is generally understood as any polymer material that includes ionized functional groups therein. Ionomeric resins are often ionic copolymers of an olefin and a salt of an unsaturated carboxylic acid. The olefin may have from about 2 to about 8 carbon atoms, and may be an alpha-olefin. The acid may be an unsaturated monocarboxylic acid having from about 3 to about 8 carbon atoms, and may be an alpha, beta-unsaturated carboxylic acid.

Commonly, ionomers are copolymers of ethylene and either acrylic acid or methacrylic acid. Copolymers may be referred to as EAA or EMAA type ionomers. In some instances, an additional co-monomer (such as an acrylate ester, i.e., iso- or n-butylacrylate, etc.) can also be included to produce a terpolymer. Terpolymer ionomers may be referred to as E/X/Y type ionomers where E is ethylenic (or olefinic) in nature, X is an alpha, beta-unsaturated carboxylic acid and Y is an acrylate ester. A wide range of ionomers are known to the person of ordinary skill in the art of golf ball manufacturing.

When a large portion of the acid groups in the ionomer is neutralized by a cation, the ionomer material may be considered to be a highly neutralized acid polymer. Generally, such a polymer is considered highly neutralized when at least 70% of the acid groups are neutralized by a cation. In various embodiments, the highly neutralized acid polymer may be neutralized to at least 75%, at least 80%, at least 85%, at least 90%, at least 95%, at least 98%, at least 99%, or substantially 100%. The acid polymer may be neutralized with a suitable cation source, such as magnesium, sodium, zinc, or lithium.

Exemplary highly neutralized acid polymer ("HNP") compositions include HPF resins such as HPF1000, HPF2000, HPF AD1024, HPF AD1027, HPF AD1030, HPF AD1035, HPF AD1040, and combinations thereof, all produced by E.I. DuPont de Nemours and Company. In some particular embodiments, the polymer used in the polymer mixture may consist essentially of a mixture of two types of highly neutralized polymers, such as a mixture of HPF1000 and HPF2000.

In other embodiments, the polymer in the polymer mixture may be a blend of a highly neutralized polymer and at least one additional polymer, the at least one additional polymer being a type of polymer other than a highly neutralized polymer. For example, the additional polymer may be a rubber or a polyurethane polymer. In such embodiments, the highly neutralized polymer may comprise at least about 10%, or at least about 25%, or at least about 50%, or at least about 75%, or at least about 90% of the total weight of polymer in the polymer mixture. The additional polymer may therefore comprise at most about 90%, or at most about 75%, or at most about 50%, or at most about 25%, or at most about 10% of the total of polymer in the polymer mixture.

The polymer as discussed variously above may be mixed with a modifier to create a polymer mixture. This polymer mixture may then be used to form any structural component of the golf ball.

Generally, the modifier may be a process oil, a plasticizer, or any mixture thereof. The modifier may cause the polymer mixture to have a value of a physical property that differs from the value of that physical property of the highly neutralized polymer. For example, the modifier may cause the polymer mixture to have a hardness that is different from the hardness of the highly neutralized polymer by itself. Therefore, the modifier modifies the highly neutralized polymer so as to result in desirable physical properties.

First, process oils are generally understood by a person having ordinary skill in the art to be any of a class of non-reactive oils which are incorporated into a material in order to affect the properties of that material. Process oils are divided into three general categories: aromatic oils, naphthenic oils, and paraffinic oils. ASTM D2226 provides a standard for categorizing a process oil into one of these three types. As the skilled practitioner recognizes, process oils typically are a blend of aromatic, naphthenic, and paraffinic oils, and are classified by the predominant types of properties and characteristics of the oil.

Generally, aromatic oils may have the highest solvency, the darkest colors, but poor color stability. Naphthenic oils may have intermediate solvency, and fair color stability. Finally, paraffinic oils may have the lowest solvency of the three types of process oils, but may have the highest color stability and the lowest volatility.

The process oil used as a modifier herein may be selected from the group consisting of aromatic process oils, naphthenic process oils, paraffinic process oils, and blends thereof.

Aromatic oils include the Sundex® family of aromatic oils available from many sources, including American Lubricants & Chemicals, LLC, in Ohio, USA. Aromatic oils may lower viscosity more than the same quantity of naphthenic oil or paraffinic oil. However, aromatic oils may cause concern over potential health issues. Namely, aromatic process oils may be subject to environmental and health related regulations in various jurisdictions.

Therefore, in an embodiment, the process oil may be selected from the group consisting of paraffinic process oils, naphthenic process oils, and blends thereof.

Particularly suitable paraffinic and naphthenic oils include, for example, Sunpar® paraffinic oil, a family of oils commercially available from Sunoco, Inc. of Pennsylvania, USA and HollyFrontier Refining and Marketing; Paralux® paraffinic oil, a family of oils commercially available from Chevron Corporation of California, USA; Unithene® naphthenic oil, a family of oils commercially available from Ergon, Inc. of Mississippi, USA; the family of oils commercially available from Idemitsu USA under the name Diana Process Oil PS, and the family of oils commercially available from Conoco-Philips under the ConoPure™ tradename. Naphthenic process oils are also disclosed in U.S. Patent Application Publication No. 2001/0018373 to Moriyama et al., entitled "Solid Center Type Thread Wound Golf Ball" and filed Jan. 12, 2011, the disclosure of which is hereby incorporated by reference.

In some embodiments, suitable process oils may also include low PCA/PHA (polycyclic aromatic/polyaromatic hydrocarbon) oils, including mild extraction solvates (MES), treated distillate aromatic extracts (TDAE), and heavy naphthenic oils. Suitable low PCA oils are further disclosed in U.S. Pat. No. 6,977,276 (column 4, line 31 up to and including column 6, line 27), the entire disclosure of which is hereby incorporated herein by reference. Hydrogenated naphthenic oils, including those disclosed in U.S. Pat. No. 6,939,910, the entire disclosure of which is hereby incorporated herein by reference, also are suitable in some embodiments.

These process oils may generally be mixed with the highly neutralized polymer in any amount. In particular, the process oil may be present in at least a quantity sufficient to affect a property of the highly neutralized polymer. Namely, the process oil modifier may be present in the polymer mixture in a sufficient amount such that the process oil modifier reduces a hardness of the polymer mixture from a first value, the first value being approximately the same as a hardness of the highly neutralized polymer itself, to a second value that is less than the hardness of the highly neutralized polymer. Beyond this minimum quantity, extremely large amounts of process oil modifier may be less than desirable due to "bleeding" of the modifier out of the polymer mixture (i.e., because the modifier is less than entirely miscible with the polymer mixture). On the other hand, small quantities may reduce the hardness, but may still leave the polymer mixture with a less than desirable hardness value.

Therefore, process oil modifiers used in the present disclosure may be present in the polymer mixture in amounts of less than about 30 parts by weight per 100 parts by weight of polymer. In some embodiments, the process oil modifier may be used in amounts of from about 1 to about 25 parts by weight per 100 parts weight of polymer. In other embodiments, the process oil modifier may be used in amounts of from about 10 to about 25 parts by weight per 100 parts weight of polymer, or from about 11 to about 25 parts by weight per 100 parts weight of polymer.

Process oils may be selected as the modifier for use in golf balls according to this disclosure as a result of a variety of factors. For example, process oils may be more economical than other types of modifiers herein. Because highly neutralized polymer material may be relatively expensive, the use of inexpensive process oils to reduce to the amount of highly neutralized polymer needed can be economically advantageous to the total cost of production of the golf ball.

Process oils may also provide better adhesion behavior, i.e., less waxy behavior, between adjacent structural components of the golf ball than other modifiers. This behavior may ensure that no adhesive layer is required to bond adjacent layers within the golf ball, or at least that no additional adhesive layer would be required. Furthermore, process oils may be more compatible with the highly neutralized polymer than other modifiers. This behavior would help avoid "bleeding" of the modifier out of the polymer mixture, both during processing of the polymer mixture and after the golf ball has been manufactured.

Plasticizers may also be used as the modifier. As is generally known to a person having ordinary skill in the art, plasticizers are a class of dispersants that increase the plasticity of a polymer material. Although the inventors do not wish to be bound by theory, it is believed that plasticizers generally work by embedding themselves between the chains of a polymer, spacing the chains apart (increasing the "free volume"), and thus lowering the glass transition temperature of the plastic and making the polymer softer.

In particular, phthalate based plasticizers may be used as the modifier. Phthalate based plasticizers may be used when good resistance to water and oils is desirable. Some suitable phthalate based plasticizers may include bis(2-ethylhexyl)

phthalate (DEHP), diisononyl phthalate (DINP), bis(n-butyl) phthalate (DnBP, DBP), butyl benzyl phthalate (BBzP), diisodecyl phthalate (DIDP), di-n-octyl phthalate (DOP or DnOP), diisooctyl phthalate (DIOP), diethyl phthalate (DEP), diisobutyl phthalate (DIBP), and di-n-hexyl phthalate.

Other plasticizers that may suitable for use as the modifier may include trimellitate based plasticizers. Trimellitates may be used in particular embodiments when resistance to high temperatures may be desirable. Trimellitates may include trimethyl trimellitate (TMTM), tri-(2-ethylhexyl)trimellitate (TEHTM-MG), tri-(n-octyl,n-decyl)trimellitate (ATM), tri-(heptyl,nonyl)trimellitate (LTM), and n-octyl trimellitate (OTM).

Adipate based plasticizers may also be used as the modifier. Adipate based plasticizers may be used in some embodiments when resistance to ultraviolet light is a consideration. Adipate based plasticizers may include bis(2-ethylhexyl)adipate (DEHA), dimethyl adipate (DMAD), monomethyl adipate (MMAD), and dioctyl adipate (DOA).

Other types of plasticizers may include sebacate-based plasticizer such as dibutyl sebacate (DBS), or maleates based plasticizer such as dibutyl maleate (DBM) or diisobutyl maleate (DIBM).

The plasticizer may generally be present in the polymer mixture in any amount. In particular embodiments, the plasticizer may be present in a minimum quantity sufficient to affect a physical property of the polymer mixture. In particular, the plasticizer may be present in the polymer mixture in amounts of less than about 30 parts by weight per 100 parts by weight of polymer. In some embodiments, the plasticizer modifier may be used in amounts of from about 1 to about 25 parts by weight per 100 parts weight of polymer. In other embodiments, the plasticizer modifier may be used in amounts of from about 10 to about 25 parts by weight per 100 parts weight of polymer, or from about 11 to about 25 parts by weight per 100 parts weight of polymer.

In some embodiments, certain materials may be used to compatibilize the modifier with the polymer in the polymer mixture. Namely, the modifier may have a less than desirable level of miscibility with the highly neutralized polymer. Such compatibilizers may ensure that the modifier does not bleed or leach out of the polymer mixture after manufacturing, as well as aid in the manufacturing process.

Compatibilizers may be useful when the structural component of the golf ball comprising the polymer mixture is a cover layer or outer cover layer. When an inner layer (such as the core, outer core, or inner cover) of the golf ball is made from the polymer mixture, bleeding and leeching may be substantially prevented by the presence of one or more layers surrounding and encapsulating the polymer mixture. Accordingly, on the other hand, when the layer comprising the polymer mixture is an outer most layer, the compatibilizers may be useful to prevent bleeding and leaching. Compatibilizers may also be particularly useful in embodiments when the modifier is a process oil.

Compatibilizers may include maleic anhydride, silanes, and titanates. The skilled practitioner recognizes that the silanes have the general formula $Si_nH_{2n+2}$. Typically, n is less than about 8, as larger molecules are only difficultly made. The titanates are compounds known to the skilled practitioner. For example, the Ken-React® family of titanate coupling agents, available from Kenrich Petrochemical, Inc., of New Jersey, USA, are suitable titanates. Suitable titanates include monoalkoxy titanates, such as KR® TTS (Titanium IV 2-propanolato, tris isooctadecanoato-O) and KR 7 (Titanium IV bis 2-methyl-2-propenoato-O, isooctadecanoato-O 2-propanolato); oxyacetate chelate titanates, such as KR® 134S (Titanium IV bis[4-(2-phenyl)-2-propyl-2]phenolato, oxoethylenediolato) and KR 138S (Titanium IV bis(dioctyl)pyrophosphato-O, oxoethylenediolato, (adduct), (dioctyl) (hydrogen)phosphite); A,B ethylene chelate titanates, such as KR® 212 (Titanium IV bis(dioctyl)phosphato-O, ethylenediolato) and KR 238S (Titanium IV bis(dioctyl)pyrophosphato-O, ethylenediolato (adduct), bis(dioctyl)hydrogen phosphite); quaternary titanates, such as KR® 138D (Titanium IV bis(dioctyl)pyrophosphato-O, oxoethylenediolato, (adduct) 2 moles of 2-N,N-dimethylamino-2-methylpropanol) and KR 158D (Titanium IV bis(butyl methyl)pyrophosphato-O, (adduct) 2 moles 2-N,N-dimethylamino-2-methylpropanol); coordinate titanates, such as KR® 41B (Titanium IV tetrakis 2-propanolato, adduct 2 moles (dioctyl) hydrogen phosphate) and KR 46B (Titanium IV tetrakis octanolato adduct 2 moles (di-tridecyl)hydrogen phosphite); neoalkoxy titanates, such as LICA® 01 (Titanium IV 2,2(bis 2-propenolatomethyl)butanolato, tris neodecanoato-O) and LICA 09 (Titanium IV 2,2(bis 2-propenolatomethyl)butanolato, tris(dodecyl)benzenesulfonato-O); and cycloheteroatom titanates, such as KR® OPPR (Titanium IV bis octanolato, cyclo(dioctyl)pyrophosphato-O,O) and KR OPP2 (Titanium IV bis cyclo(dioctyl)pyrophosphato-O,O). With the guidance provided herein, the skilled practitioner will be able to identify suitable titanates for use in embodiments of the disclosure.

The polymer mixture may also include other ingredients in addition to the polymer, the modifier, and optionally the compatibilizer. For example, the polymer mixture may also include one or more fatty acids. Fatty acids are known to be used to control the physical properties of a polymer. The presence of a fatty acid may therefore further affect the physical properties, such as hardness, of the polymer mixture comprising the highly neutralized polymer.

Generally, as is known in the art, a fatty acid is a carboxylic acid with a long unbranched aliphatic tail. The tail may be saturated or unsaturated. Generally, the fatty acid may have any chain length of from about five carbons to about 30 carbons. Representative saturated fatty acids that may be used in this disclosure include lauric acid, myristic acid, palmitic acid, stearic acid, arachidic acid, behenic acid, lignoceric acid, cerotic acid, and mixtures thereof. Representative unsaturated fatty acids that may be used in this disclosure include myristoleic acid, palmitoleic acid, sapienic acid, oleic acid, elaidic acid, vaccenic acid, linoleic acid, α-linolenic acid, arachidonic acid, eicosapentaenoic acid, erucic acid, docosahexaenoic acid, and mixtures thereof. Unsaturated fatty acids may be used in either or both of the cis or trans species.

The skilled practitioner recognizes that various materials may be added to the HNP comprising hardness modifier. It is possible that some of these various additive materials may be a pulverulent material that may tend to become airborne and be difficult to distribute evenly in the HNP. Such a pulverulent material may be available in combination with a carrier such as a dispersant oil, for example. Although typically the amount of oil introduced in such systems is small, the skilled practitioner recognizes that the total amount of oil from all sources in the HNP typically should be less than about 35 parts per hundred parts HNP by weight, or less than about 15 parts per hundred parts HNP by weight, or less than about 10 parts per hundred HNP by weight.

The skilled practitioner recognizes that the layers, or pieces, also may include further components such as fillers and/or additives. Fillers and additives may be used based on any of a variety of desired characteristics, such as enhancement of physical properties, UV light resistance, and other properties. For example, to improve UV light resistance, a light stabilizer is added. Light stabilizers may include hindered amines, UV stabilizers, or a mixture thereof.

Inorganic or organic fillers can be also added to any layer. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 50 percent by weight of the layer.

Other density adjusting agents, such as hollow beads that have a low density, also may be used in selected layers.

The skilled practitioner recognizes that these additives, including in particular the density adjusters, affect the performance properties and characteristics of the layer. Thus, the amount of any fillers may not exceed that amount that adversely affects the performance of the golf ball.

The outermost layer of a golf ball also may include at least one white pigment to aid in better visibility. The white pigment may be selected from the group consisting of titanium dioxide, zinc oxide, and mixtures thereof.

With the guidance provided herein, the skilled practitioner will be able to select additives as may be appropriate for each layer or piece of the golf ball.

As a result of the modifier, one or more physical properties of the polymer mixture may be changed. In particular, the modifier may affect the hardness. Generally, highly neutralized polymers have high hardness values. The hardness of a highly neutralized polymer used in this disclosure may be at least about 40 Shore D, at least about 50 Shore D, or at least about 60 Shore D. As discussed above, this high hardness value may prevent the golf ball from having a soft feel when hit by a golf club, and may also cause the golf ball to have a less than desirable sound when struck.

In particular, the highly neutralized polymer used in the polymer mixture may have a first hardness value. The presence of the modifier may then change a hardness value of the polymer mixture from the first value to a second hardness value, where the second hardness value is different from the first hardness value. In particular embodiments, the presence of the modifier reduces a hardness value of the polymer mixture from a first value (that is the same as the hardness of the highly neutralized polymer) to a second value that is less than the hardness of the highly neutralized polymer.

The difference between the first value and the second value may generally be any measurable difference in hardness. In various embodiments, the second value may be at least about 2 Shore D less than the first value, or at least about 3 Shore D, or at least about 5 Shore D, or at least about 8 Shore D, or at least about 10 Shore, or at least about 12 Shore D, or at least about 15 Shore D, or at least about 20 Shore D. Therefore, for example, in an embodiment where the highly neutralized polymer has a hardness of about 50 Shore D (i.e., the first value is 50 Shore D), then the polymer mixture may have hardness of about 48 Shore D, or about 47 Shore D, or about 45 Shore D, or about 42 Shore D, or about 40 Shore D, or about 38 Shore D, or about 35 Shore D, or about 30 Shore D as a result of the modifier.

This change in hardness may also be expressed as a proportion. For example, the proportion by which the hardness changes as a result of the presence of the modifier may be at least about 1%, at least about 2%, at least about 3%, at least about 5%, at least about 8%, at least about 10%, at least about 15%, or at least about 20%.

As a result of this change in hardness, a golf ball that includes the polymer mixture may both include highly neutralized polymer and achieve lower hardness value. This may be especially conducive to a soft feel and preferable sound in embodiments where the core (or inner core) is comprised of the polymer mixture.

However, the inclusion of the modifier may also affect physical properties of the polymer mixture other than the hardness. Specifically, the modifier may affect the resilience of the material, as measured by a COR of the golf ball or golf ball component made from the polymer mixture. Specifically, the modifier may reduce the COR. A higher COR is generally preferable, in order to achieve better energy transfer between a golf club head face and the golf club during a drive. However, a golf ball with a highly neutralized polymer core (or inner core) may have a rather high COR, equal to about 0.84 or more. Therefore, even if the modifier reduces this COR value, the COR may still be within an acceptable range. This golf ball including the modifier may accordingly achieve a soft feel while maintaining a high COR.

For example, a core or inner core comprised of a highly neutralized polymer by itself may have a COR value of from about 0.79 to about 0.89, or from about 0.8 to about 0.89. Generally, the inclusion of the modifier may reduce the COR by at least any measurable amount. For example, the COR of a core or inner core comprised of the polymer mixture may have a value that is at most about 0.01 less than a value of the core or inner core comprised of the highly neutralized polymer by itself. In other words, a core or inner core comprised of the highly neutralized polymer by itself without the modifier may have a first COR value, and a substantially identical core or inner core comprised of the polymer mixture may have a second COR value, where the second COR value is less than the first COR value. In various embodiments, the second COR value may be at most about 0.05 less than the first COR value, or at most about 0.10, or at most about 0.15, or at most about 0.20, or at most about 0.25.

This change in COR may also be expressed as a proportion. For example, the difference between the first COR value and the second COR value may be less than about 1%, or less than about 2%, or less than about 3%, or less than about 5%, or less than about 7%, or less than about 10%, or less than about 12%, or less than about 15%, or less than about 20%.

Generally, the change in hardness may be desirable while the change in COR may be undesirable. Therefore, the proportion by which the hardness changes may have a relation to the proportion by which the COR changes. Generally, the proportion by which the hardness is reduced may be greater than the proportion by which the COR is reduced. The proportion by which the hardness is reduced may be referred to as the first proportion, while the proportion by which the COR is reduced may be referred to as the second proportion.

The relationship between the first proportion and the second proportion may be expressed as a ratio. For example, the ratio of the first proportion to the second proportion may be greater than about 2:1, or greater than about 3:1, or greater than about 4:1, or greater than about 5:1.

Furthermore, any of the above discussed values of the first proportion and the second proportion may be exhibited in combination, depending on the amount of modifier in the polymer mixture. For example, in one embodiment, the first proportion may be at least about 10%, and the second proportion may at most about 5%. In another embodiment, the first proportion may be more than 5% while the second proportion is less than 5%.

This disclosure also provides a method of manufacturing a golf ball. The method uses the addition of the modifier to the highly neutralized polymer to control the hardness of the resulting polymer mixture. This method therefore produces a golf ball having a desirable hardness value, with only minimal undesirable changes in other physical properties such as resilience. The features discussed variously above with respect to the golf ball itself, such as the composition of various components, modifiers, additives, etc. and the amounts and effects thereof are equally applicable to the method disclosed herein.

The method includes a step of receiving a highly neutralized polymer. This step encompasses receiving a highly neutralized polymer precursor, such as an unreacted batch of monomers (and/or oligomers) and neutralization ion source, that can be reacted to form a highly neutralized polymer.

The method next includes a step of changing the hardness of the highly neutralized polymer by mixing a modifier therewith to form a polymer mixture. This mixing may occur through mixing/kneading on a sheeting mill, or through mixing in an extruder. The materials may be mixed (melt blended) in any suitable fashion, such as a twin screw extruder, a Banbury type mixer or a two roll mill. The highly neutralized polymer may be pre-heated prior to mixing. Alternatively, the highly neutralized polymer may be polymerized from a precursor and mixed with the modifier substantially simultaneously.

As discussed above, the modifier may be selected from the group consisting of process oils, plasticizers, and blends thereof. More specifically, the modifier may be selected from the group consisting of naphthenic process oils, paraffinic process oils, phthalate esters, trimellitates, adipates, sebacate-based plasticizer, maleate-based plasticizer, and blends thereof. The modifier may be present in the polymer mixture in an amount of from about 11 to about 25 parts by weight per 100 parts by weight of highly neutralized polymer, or other amounts as discussed above.

The modifier may be present in the polymer mixture of the method in a sufficient amount such that the modifier reduces a hardness of the polymer mixture from a first value that is approximately the same as a hardness of the highly neutralized polymer to a second value that is less than the hardness of the highly neutralized polymer. The presence of the modifier may also reduce a hardness value of the polymer mixture by a first proportion, and may reduce the COR value of the core by a second proportion, where the first proportion may be greater than the second proportion.

The method also includes a step of forming the polymer mixture into a core. This step may be done substantially simultaneously with the step of mixing, and/or with the step of forming the highly neutralized polymer from a precursor. Alternatively, the step of forming the core may be done sequentially after the above discussed steps. The core may be formed by any process known to be used in golf ball manufacturing, such as compression molding or injection molding.

The method also includes a step of forming a cover layer around the core, such that the cover layer substantially surrounds the core. The cover layer may be formed in accordance with various golf ball manufacturing techniques known to a person of ordinary skill in the art. The method may also include other conventional golf ball manufacturing steps, such as finishing and clear coating steps, as may be desired.

EXAMPLES

The following Tables show various exemplary compositions that are within the scope of this disclosure. All numbers in the Tables are given in parts by weight.

HNP, or a blend of HNPs, is blended with a process oil, a blend of process oils, or a plasticizer, in the ratios set forth in the Tables. The resultant products have properties and characteristics consistent with the disclosure herein.

TABLE 1

| Component | 1 | 2 | 3 | 4 | 5 | 6 | 7 | 8 | 9 | 10 | 11 | 12 |
|---|---|---|---|---|---|---|---|---|---|---|---|---|
| Highly neutralized polymer | | | | | | | | | | | | |
| HPF 2000 | 80 | 80 | 80 | 40 | 40 | 80 | 90 | 90 | 90 | 45 | 45 | 90 |
| HPF AD 1035 | | | | 40 | 40 | | | | | 45 | 45 | |
| Modifier - Process Oil | | | | | | | | | | | | |
| Aromatic - Sundex 840 ® | 20 | | | | | | 10 | | | | | |
| Naphthenic - Unithene ® | | 20 | | 20 | | | | 10 | | 10 | | |
| Paraffinic - Sunpar ® | | | 20 | | 20 | | | | 10 | | 10 | |
| Phthalate plasticizer - DINP | | | | | | 20 | | | | | | 10 |
| Total: | 100 | 100 | 100 | 100 | 100 | 100 | 100 | 100 | 100 | 100 | 100 | 100 |

TABLE 2

| Component | 13 | 14 | 15 | 16 | 17 | 18 | 19 | 20 | 21 | 22 | 23 | 24 |
|---|---|---|---|---|---|---|---|---|---|---|---|---|
| Highly neutralized polymer | | | | | | | | | | | | |
| HPF 2000 | 97 | 97 | 97 | 48.5 | 48.5 | 97 | 95 | 95 | 95 | 47.5 | 47.5 | 95 |
| HPF AD 1035 | | | | 48.5 | 48.5 | | | | | 47.5 | 47.5 | |
| Modifier - Process Oil | | | | | | | | | | | | |
| Aromatic - Sundex 840 ® | 3 | | | | | | 5 | | | | | |
| Naphthenic - Unithene ® | | 3 | | 3 | | | | 5 | | 5 | | |

TABLE 2-continued

| Component | 13 | 14 | 15 | 16 | 17 | 18 | 19 | 20 | 21 | 22 | 23 | 24 |
|---|---|---|---|---|---|---|---|---|---|---|---|---|
| Paraffinic - Sunpar ® | | | 3 | | 3 | | | | 5 | | 5 | |
| Phthalate plasticizer - DINP | | | | | | 3 | | | | | | 5 |
| Total: | 100 | 100 | 100 | 100 | 100 | 100 | 100 | 100 | 100 | 100 | 100 | 100 |

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. For example, different HNPs, different modifiers, or different proportions of the various components may be used within the scope of the disclosure.

What is claimed is:

1. A golf ball, comprising:
a core;
a cover layer, the cover layer substantially surrounding the core;
at least one of the core and the cover layer being made of a polymer mixture, the polymer mixture comprising a polymer and a modifier;
the polymer comprising a highly neutralized polymer;
the modifier comprising a process oil selected from the group consisting of naphthenic process oils, paraffinic process oils, aromatic process oils, and blends thereof;
wherein the modifier is present in the polymer mixture in a sufficient amount such that the modifier reduces a hardness of the polymer mixture from a first value that is approximately the same as a hardness of the highly neutralized polymer to a second value that is less than the hardness of the highly neutralized polymer.

2. The golf ball of claim 1, wherein the modifier further comprises a plasticizer selected from the group consisting of phthalate esters, trimellitates, adipates, sebacate-based plasticizer, maleate-based plasticizer, and blends thereof.

3. The golf ball of claim 2, wherein the plasticizer is di-isononyl phthalate.

4. The golf ball of claim 1, wherein the modifier is present in the polymer mixture in an amount of from about 1 to about 25 parts by weight per 100 parts by weight of polymer.

5. The golf ball of claim 1, wherein the second value is at least about 3 Shore D less than the first value.

6. The golf ball of claim 1, wherein the polymer mixture further comprises a compatibilizer selected from the group consisting of maleic anhydride, silanes, titanates, and blends thereof.

7. The golf ball of claim 1, wherein the cover layer comprises the polymer mixture, and the polymer mixture further comprises a compatibilizer selected from the group consisting of maleic anhydride, silanes, titanates, and blends thereof.

8. The golf ball of claim 1, wherein
the core comprises the polymer mixture; and
the presence of the modifier reduces a COR value of the core by a proportion that is less than a proportion by which the presence of the modifier causes the polymer mixture to have a lower hardness than the hardness of the highly neutralized polymer.

9. A golf ball comprising:
an inner core;
an outer core layer, the outer core layer substantially surrounding the inner core;
at least one cover layer, the at least one cover layer substantially surrounding the outer core layer;
at least one of the inner core and the outer core layer being comprised of a polymer mixture, the polymer mixture comprising a polymer and a modifier;
the polymer comprises at least one highly neutralized polymer;
the modifier being selected from the group consisting of naphthenic process oils, paraffinic process oils, phthalate esters, trimellitates, adipates, sebacate-based plasticizer, maleate-based plasticizer, and blends thereof;
wherein the modifier is present in the polymer mixture in an amount of from about 1 to about 25 parts by weight per 100 parts by weight of polymer; and
wherein the modifier is present in the polymer mixture in a sufficient amount such that the modifier reduces a hardness of the polymer mixture from a first value that is approximately the same as a hardness of the highly neutralized polymer to a second value that is less than the hardness of the highly neutralized polymer, the second value being at least about 2 Shore D less than the first value.

10. The golf ball of claim 9, wherein the modifier is di-isononyl phthalate.

11. The golf ball of claim 9, wherein
the inner core comprises the polymer mixture;
the presence of the modifier in the polymer material reduces a COR value of the inner core by less than 5%; and
the presence of the modifier in the polymer mixture reduces the hardness of the polymer mixture by more than 5%.

12. The golf ball of claim 9, wherein the inner core has a diameter of from about 20 to about 30 mm, and the outer core layer has a thickness of from about 3 to about 10 mm.

13. The golf ball of claim 9, wherein the polymer consists essentially of a mixture of two types of highly neutralized polymers.

14. The golf ball of claim 9, wherein the polymer comprises a blend of the highly neutralized polymer and at least one additional polymer, the at least one additional polymer being a type of polymer other than a highly neutralized polymer.

15. A method of manufacturing a golf ball, the method comprising:
receiving a highly neutralized polymer,
changing the hardness of the highly neutralized polymer by mixing a modifier therewith to form a polymer mixture, the modifier being selected from the group consisting of process oils, plasticizers, and blends thereof;
forming the polymer mixture into a core;
forming a cover layer around the core, such that the cover layer substantially surrounds the core;
wherein the modifier is present in the polymer mixture in a sufficient amount such that the modifier reduces a hardness of the polymer mixture from a first value that is approximately the same as a hardness of the highly neutralized polymer to a second value that is less than the hardness of the highly neutralized polymer; the presence of the modifier reduces a hardness value of the polymer mixture by a first proportion, the presence of the modifier reduces the COR value of the core by a second proportion, and the first proportion is greater than the second proportion.

16. The method of claim 15, wherein the modifier is selected from the group consisting of naphthenic process oils, paraffinic process oils, phthalate esters, trimellitates, adipates, sebacate-based plasticizer, maleate-based plasticizer, and blends thereof.

17. The method of claim 15, wherein the modifier is present in the polymer mixture in an amount of from about 1 to about 25 parts by weight per 100 parts by weight of highly neutralized polymer.

18. The method of claim 15, wherein a ratio of the first proportion to the second proportion is greater than about 2:1.

19. The method of claim 15, wherein the first proportion is at least about 10%, and the second proportion is at most about 5%.

* * * * *